United States Patent [19]
Fritze et al.

[11] Patent Number: 5,305,437
[45] Date of Patent: Apr. 19, 1994

[54] GRAPHICAL SYSTEM DESCRIPTOR METHOD AND SYSTEM

[75] Inventors: Nathan K. Fritze, Boca Raton; Mitchell E. Medford, Delray Beach, both of Fla.

[73] Assignee: International Business Machines Corporation, Armonk, N.Y.

[21] Appl. No.: 758,973

[22] Filed: Sep. 3, 1991

[51] Int. Cl.⁵ .............................................. G06F 15/20
[52] U.S. Cl. .................................. 395/162; 395/155; 395/725
[58] Field of Search ............... 395/155, 161, 162, 275, 395/163, 164, 165, 166; 364/488, 489, 490, 491

[56] References Cited

U.S. PATENT DOCUMENTS

| | | |
|---|---|---|
| 3,928,830 | 12/1975 | Bellamy . |
| 4,709,366 | 11/1987 | Scott et al. . |
| 4,713,815 | 12/1987 | Bryan et al. . |
| 4,766,595 | 8/1988 | Gollomp ............................ 371/23 |
| 4,872,167 | 10/1989 | Maezawa et al. . |
| 4,878,179 | 10/1989 | Larsen et al. . |
| 5,046,034 | 9/1991 | Stark et al. ...................... 364/580 |
| 5,084,875 | 1/1992 | Weinberger et al. ............. 371/291 |
| 5,107,497 | 4/1992 | Lirov et al. ....................... 371/15.1 |
| 5,157,668 | 10/1992 | Buenzli et al. .................... 371/15.1 |

Primary Examiner—Dale M. Shaw
Assistant Examiner—U. Chauhan
Attorney, Agent, or Firm—Duke W. Yee; Andrew J. Dillon

[57] ABSTRACT

A method and system for a graphical hardware description and testing interface is provided for use in conjunction with a data processing system. A polling system is provided for determining the configuration of the data processing system, including identification of the components. A graphic display is coupled to the polling system and utilized to display a graphic depiction of the data processing system, including any components. This graphic depiction is displayed in response to a determination of the configuration of the data processing system. The graphical hardware description and testing interface also includes a testing program for selectively testing a particular component to determine whether the component is defective. Also included is a display control circuit coupled to the graphic display. This display control circuit is utilized to selectively alter the graphic depiction of the data processing system, including any components, in response to the testing of the component.

17 Claims, 9 Drawing Sheets

GRAPHICAL SYSTEM DESCRIPTOR METHOD AND SYSTEM

BACKGROUND OF THE INVENTION

1. Field of the Invention

The present invention relates in general to a method and apparatus for identifying defective components in a data processing system, and, in particular, to a method and apparatus for graphically depicting and testing components in a data processing system. Still more particularly, the present invention provides a graphic user interface which may be utilized in graphically depicting and testing components in a data processing system.

2. Description of the Prior Art

Diagnostics Control Programs ("DCP") are known and are normally utilized to manage the user interface with respect to hardware tests in a data processing system. When this DCP is administering tests, all communications between the tests and the user are accomplished with text-based messages. Such text-based messages give no indication of the location of the component currently being tested. When a component is found to be defective, and the DCP is operating in an advanced mode, the error message displayed may be cryptic and somewhat confusing concerning the component's location within the system. As a result, an incorrect and/or non-failing component may be replaced by a technician.

Therefore it would be desirable to have a method and apparatus for graphically depicting and testing components in a data processing system.

SUMMARY OF THE INVENTION

It is one object of the present invention to provide a method and apparatus for identifying defective components in a data processing system.

It is another object of the present invention to provide a method and apparatus for graphically depicting and testing components in a data processing system.

It is yet another object of the present invention to provide a graphic user interface which may be utilized in graphically depicting and testing components in a data processing system.

The foregoing objects are achieved as is now described. In accordance with the apparatus of the present invention, a graphical hardware description and testing interface is provided for use in conjunction with a data processing system. A polling system is provided and utilized for determining the configuration of the data processing system, including an identification of any components. A graphic display is coupled to the polling means and utilized to display a graphic depiction of the data processing system, including any identified components. This graphic depiction is displayed in response to a determination of the configuration of the data processing system. The graphical hardware description and testing interface also includes a testing program for selectively testing a particular component to determine whether the component is defective. Also included is a display control coupled to the graphic display. This display control is utilized to selectively alter the graphic depiction of the data processing system, including the components, in response to the results of the data processing system and testing of the components.

The method of the present invention is utilized in a data processing system to provide a graphic user interface for graphically depicting and testing t he data processing system. First, a configuration of the data processing system is determined, including an identification of any components. Next, a graphic depiction of the data processing system, including any identified components, is displayed. Thereafter, the method of the present invention selectively tests a particular component to determine whether the component is defective, and the graphic depiction of the data processing system, including any identified components, is selectively altered in response to the results of the testing of the data processing system and components.

The above as well as additional objects, features, and advantages of the invention will become apparent in the following detailed description.

BRIEF DESCRIPTION OF THE DRAWINGS

The novel features believed characteristic of the invention are set forth in the appended claims The invention itself, however, as well as a preferred mode of use, further objects and advantages thereof, will best be understood by reference to the following detailed description of an illustrative embodiment when read in conjunction with the accompanying drawings, wherein:

DETAILED DESCRIPTION OF THE INVENTION

Figure 1:
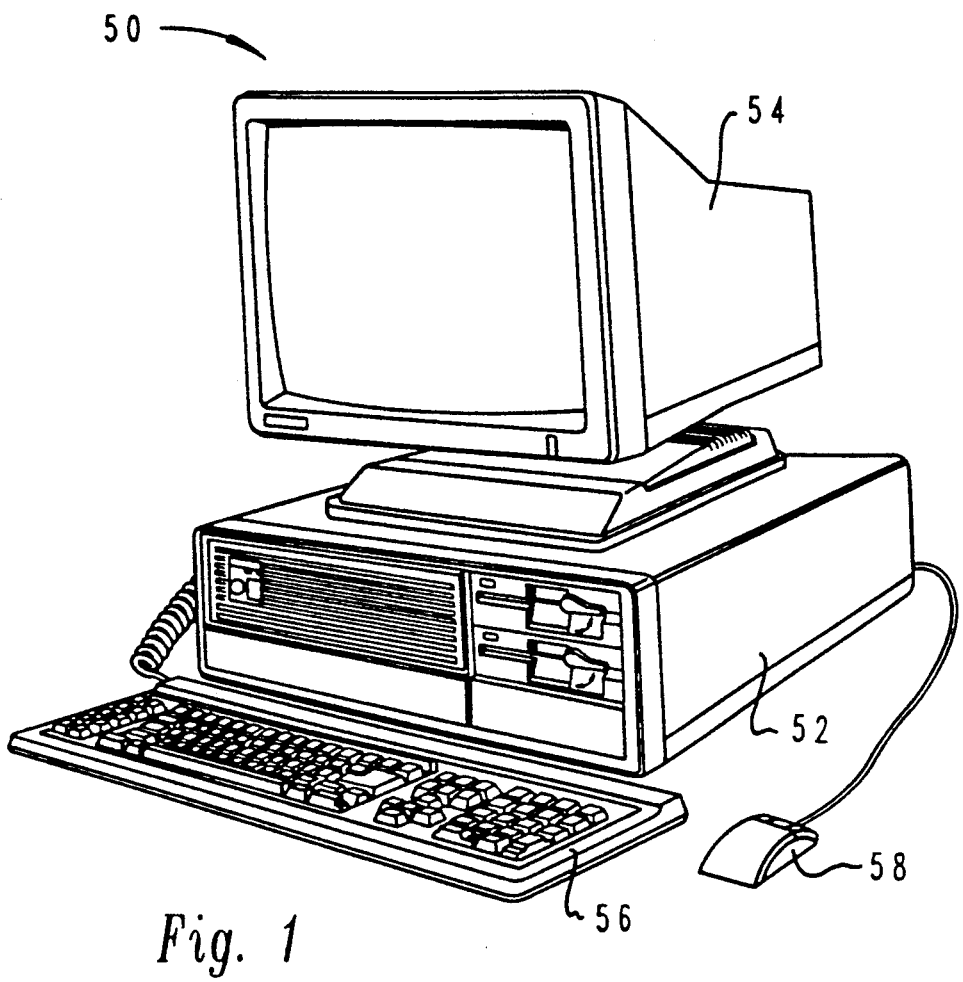
FIG. 1 depicts an example of a data processing system in which the present invention may be implemented.

With reference now to the figures and in particular with reference to FIG. 1, there is depicted an example of a data processing system in which the present invention may be implemented. A personal computer 50 is depicted which includes a system unit 52, a video display terminal 54, a keyboard 56, and a mouse 58. Personal computer 50 may be implemented utilizing any suitable computer such as the IBM PS/2 computer.

Figure 2:
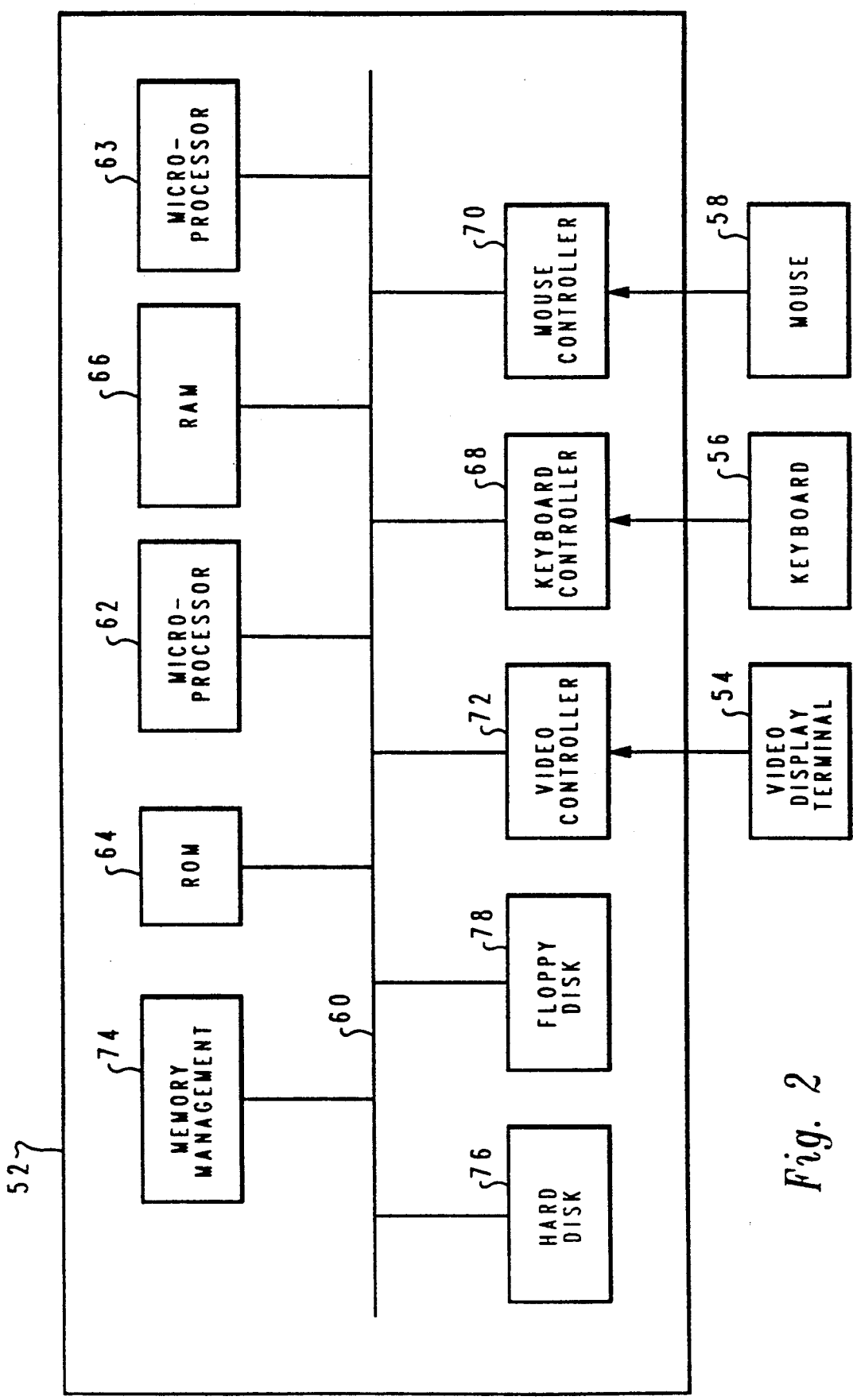
FIG. 2 is a block diagram of the computer system shown in FIG. 1.

FIG. 2 is a block diagram of the components of the computer system shown in FIG. 1. System unit 52 preferably includes a system bus 60 for connecting and establishing communication between various components in system 52. A microprocessor 62, Read Only Memory ("ROM") 64, and Random Access Memory ("RAM") 66 are connected to system bus 60. Microprocessor 62 in a preferred embodiment of the present invention is an Intel 80386 or 80486 microprocessor, but other microprocessors may also be utilized in a different data processing system. Microprocessor 63 is subservient to microprocessor 62 (the dominant processor).

ROM 64, contains, among other code, a Basic Input/Output System ("BIOS") which controls hardware operations, such as those involving disk drives and the keyboard. RAM 66 is the memory into which an operating system and application programs are loaded.

System unit 52 also contains input/output ("I/O") controllers: a keyboard controller 68, a mouse controller 70, and a video controller 72. These controllers are connected to system bus 60. Keyboard controller 68 provides a hardware interface for keyboard 56, mouse controller 70 provides a hardware interface from mouse 58, and video controller 72 provides a hardware interface for the video display terminal 54.

A memory management chip 74 is connected to system bus 60 and controls Direct Memory Access ("DMA") operations, including paging data between RAM 66 and a hard disk drive 76 and a floppy disk drive 78.

Those skilled in the art will appreciate that the hardware depicted in FIGS. 1 and 2 may vary for specific applications. For example, additional peripheral devices such as an optical disk media, printer, modems, and the like may be utilized in addition to or in place of the hardware already shown.

Figure 3:
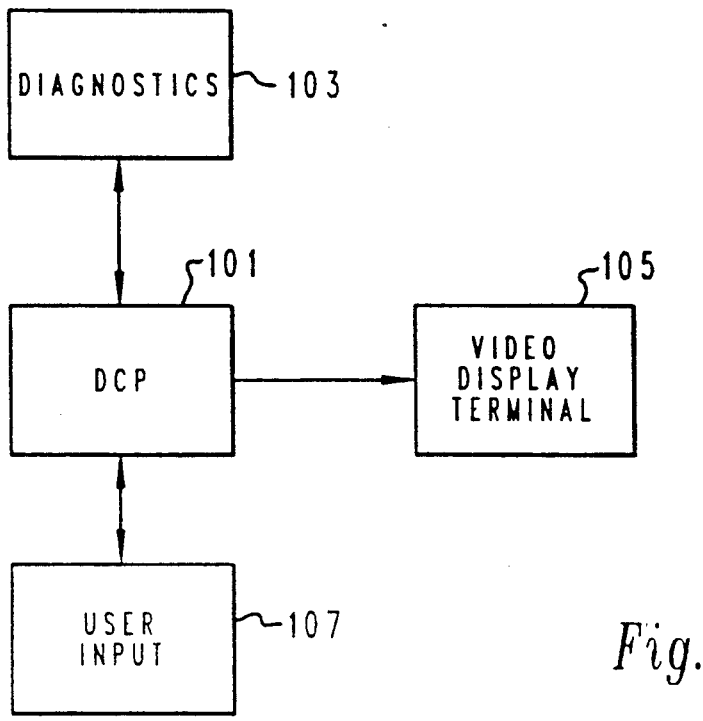
FIG. 3 depicts a block diagram of the method and system for providing a graphic user interface for graphically depicting and testing a data processing system in accordance with a preferred embodiment of the present invention.

FIG. 3 depicts a block diagram of the system for providing a graphic user interface for graphically depicting and testing a data processing system in accordance with a preferred embodiment of the present invention. The Diagnostic Control Program ("DCP") 101 calls diagnostic system 103 in a set up mode. Diagnostic system 103 communicates with DCP 101 through interrupts to display messages on video display terminal 105 or request user input from an input device 107, such as a pointing device or a keyboard.

After setup, diagnostic system 103 returns to DCP. If the setup was successful, then DCP 101 calls diagnostic system 103 in execution mode. As a result, diagnostic system 103 runs tests, and any screen output to video display 105 or keyboard/pointing device input is controlled by DCP 101. Next, diagnostic system 103 returns test execution completion status, including error messages if errors are detected, while DCP 101 will cause graphical depictions of the data processing system to be displayed on video terminal 105.

Figure 4:
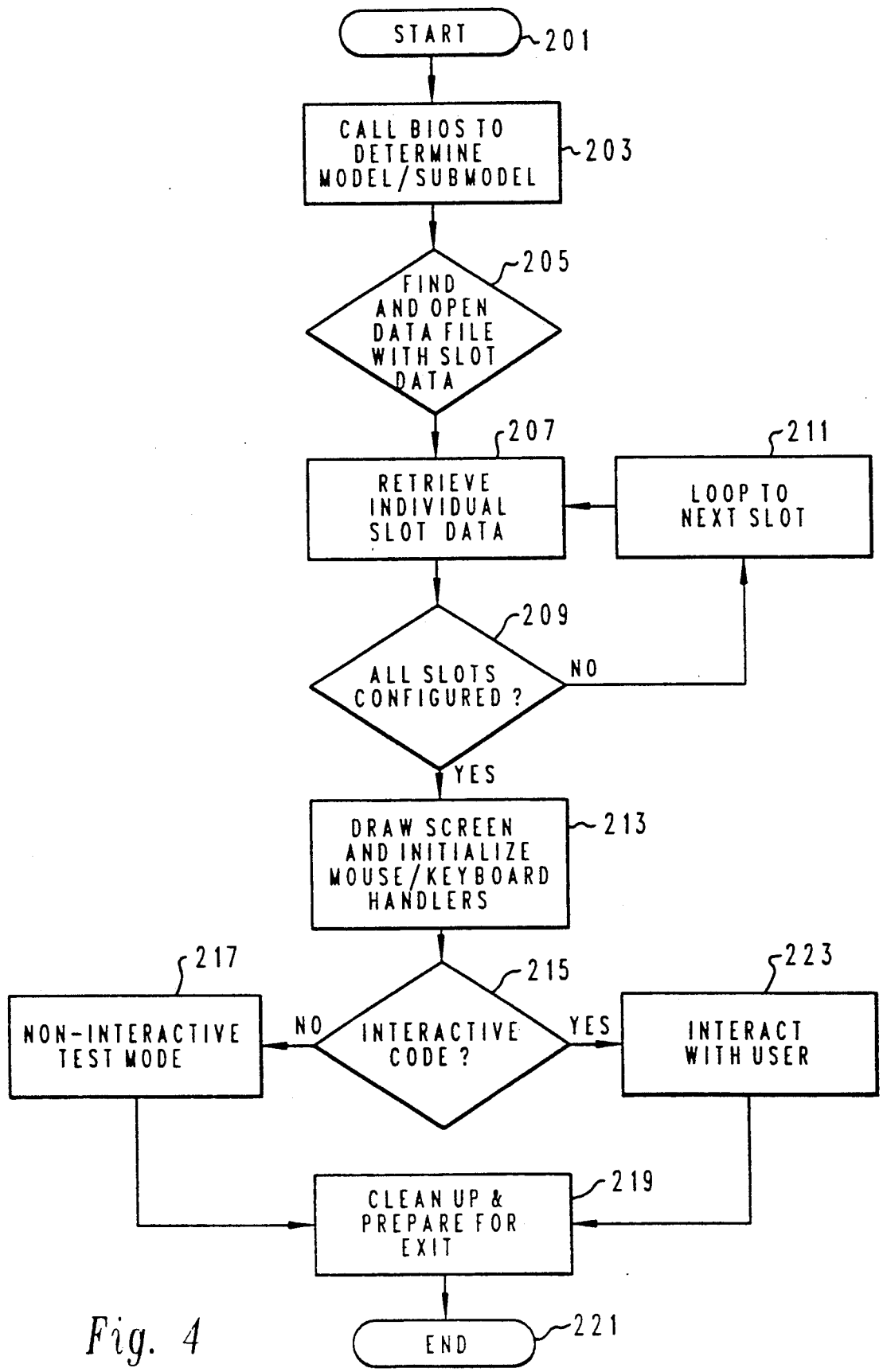
FIG. 4 is a high level flowchart of a process for obtaining system information in the method and system of a graphical hardware description and testing interface for use in conjunction with a data processing system in accordance with a preferred embodiment of the presence invention.

FIG. 4 is a high level flowchart of a process for obtaining system information in the method and system of a graphical hardware description and testing interface for use in conjunction with a data processing system in accordance with a preferred embodiment of the presence invention. This portion of the present invention polls the data processing system to determine the configuration—layout of slots, subslots, components, and subcomponents. As illustrated, the process begins at block 201 and thereafter passes to block 203 which depicts a call to the BIOS to determine model/submodel and the identity of the system. Block 205 illustrates the finding and opening of a data file containing slot data. The data file contains information on the planar structure of the particular data processing system. The process then proceeds to block 207 which depicts the retrieving of individual slot data. Next, the process proceeds to block 209 which illustrates a determination of whether all the slots have been configured. If all of the slots have not been configured, the process then proceeds to block 211, which depicts looping to the next slot. This loop is continued until all of the slots are configured.

Referring back to block 209, if all of the slots have been configured, the process then continues to block 213, which depicts drawing the screen and initializing mouse/keyboard handlers. The screen graphically depicts a planar view of the system with the graphical depiction of slots and components corresponding to actual locations on the data processing system. Block 215 illustrates a determination of whether the code is interactive. If the code is not interactive, the process proceeds to block 217, which depicts a non-interactive test mode. This is basically a "no user" mode in which all testing is performed automatically without use input. Afterwards, the process continued to block 219 which illustrates "cleaning up" and preparing for exit. In "cleaning up", all parameters are reset to their original state. In this manner, the data processing system is returned to its original state before running the program. Afterwards, the process terminates as illustrated in block 221. Referring back to block 215, if the code is interactive, the process then proceeds to block 223 which depicts interaction with the user. Thereafter, the process proceeds to block 219, illustrating cleaning up and preparing for exit. The process then terminates as illustrated in block 221.

Figure 5:
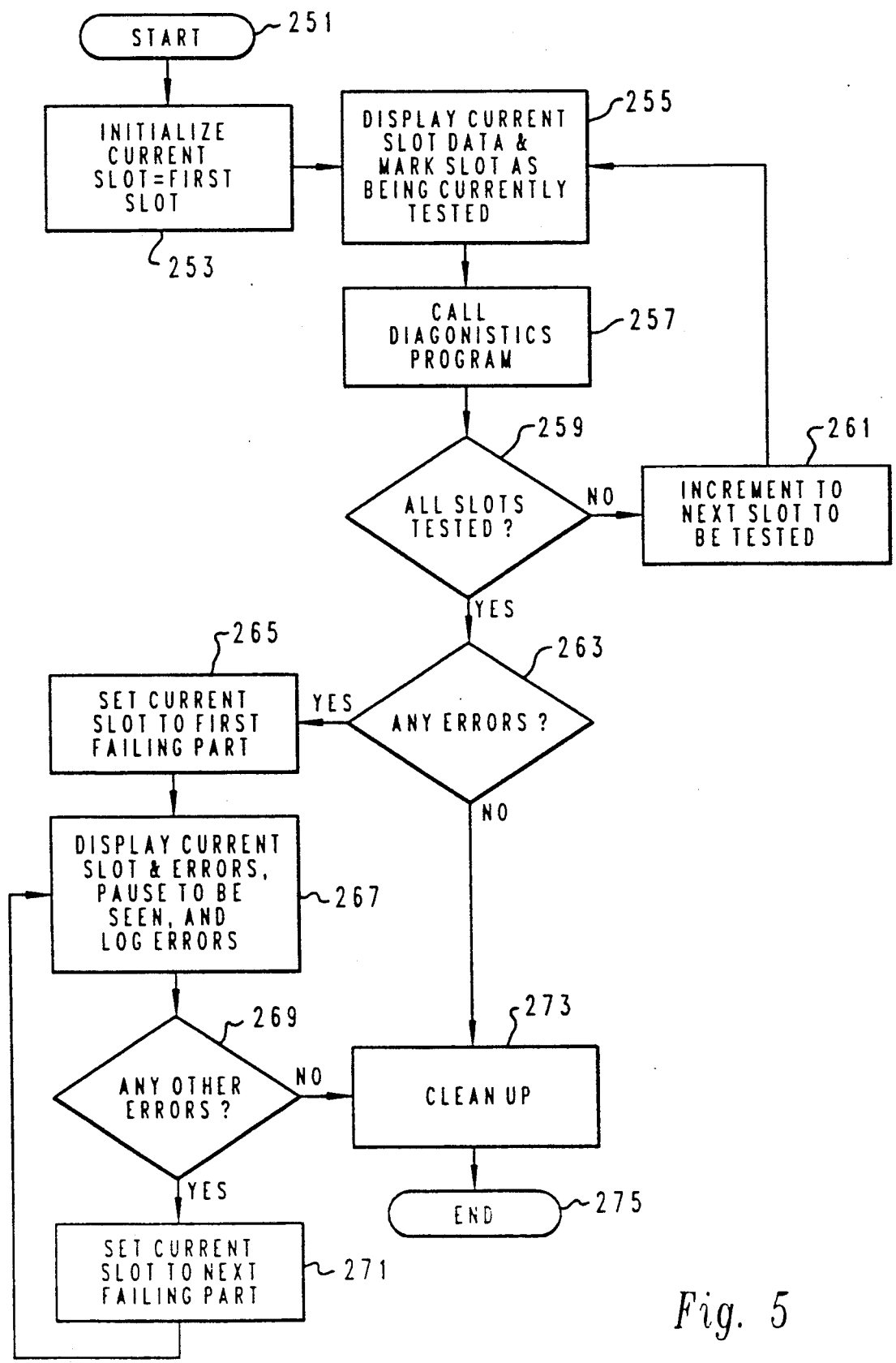
FIG. 5 depicts a high level block diagram of the no user test mode in the method and system for providing a graphic user interface for graphically depicting and testing a data processing system in accordance with a preferred embodiment of the invention.

FIG. 5 depicts a high level block diagram of the "no user" test mode in the method and system for providing a graphic user interface for graphically depicting and testing a data processing system in accordance with a preferred embodiment of the invention. The "no user" test mode begins in block 251 and thereafter proceeds to block 253, illustrating initialization of the current slot by setting it equal to the first slot. The process proceeds to block 255, which depicts the displaying of current slot information and the marking of the slot as being currently tested.

Next, the process proceeds to block 257, which illustrates the calling of the diagnostics program. This block is the diagnostics portion of the graphic user interface in accordance with a preferred embodiment of the present invention. The process proceeds to block 259, which depicts a determination of whether all slots have been tested. If not all of the slots have been tested, the process proceeds to block 261, illustrating incrementing to the next slot to be tested. The process thereafter proceeds to block 255 which depicts the displaying of current slot information and marking the slot as being currently tested. Again the diagnostics program is called in block 257.

Referring back to block 259, if all of the slots have been tested, the process then proceeds to block 263, which illustrates a determination of whether any errors have occurred.

If an error has occurred, the process proceeds to block 265, which depicts the setting of the current slot to first failing part. Thereafter, the process proceeds to block 267, illustrating the displaying of the current slot and error messages. Next, the process proceeds to block 269, which depicts a determination of whether other errors exist. If other errors exist, the process proceeds to block 271, Which illustrates the setting of the current slot to next failing part. The process then returns to block 267, illustrating the displaying of the current slot and error messages.

Referring back to block 269, if no other errors exist, the process then proceeds to block 273, which depicts cleaning up from tests. Thereafter, the process terminates in block 275.

Referring back to block 263, if no errors occurred, the process then proceeds to block 273, depicting cleaning up from testing with the process terminating again in block 275.

Figure 6:
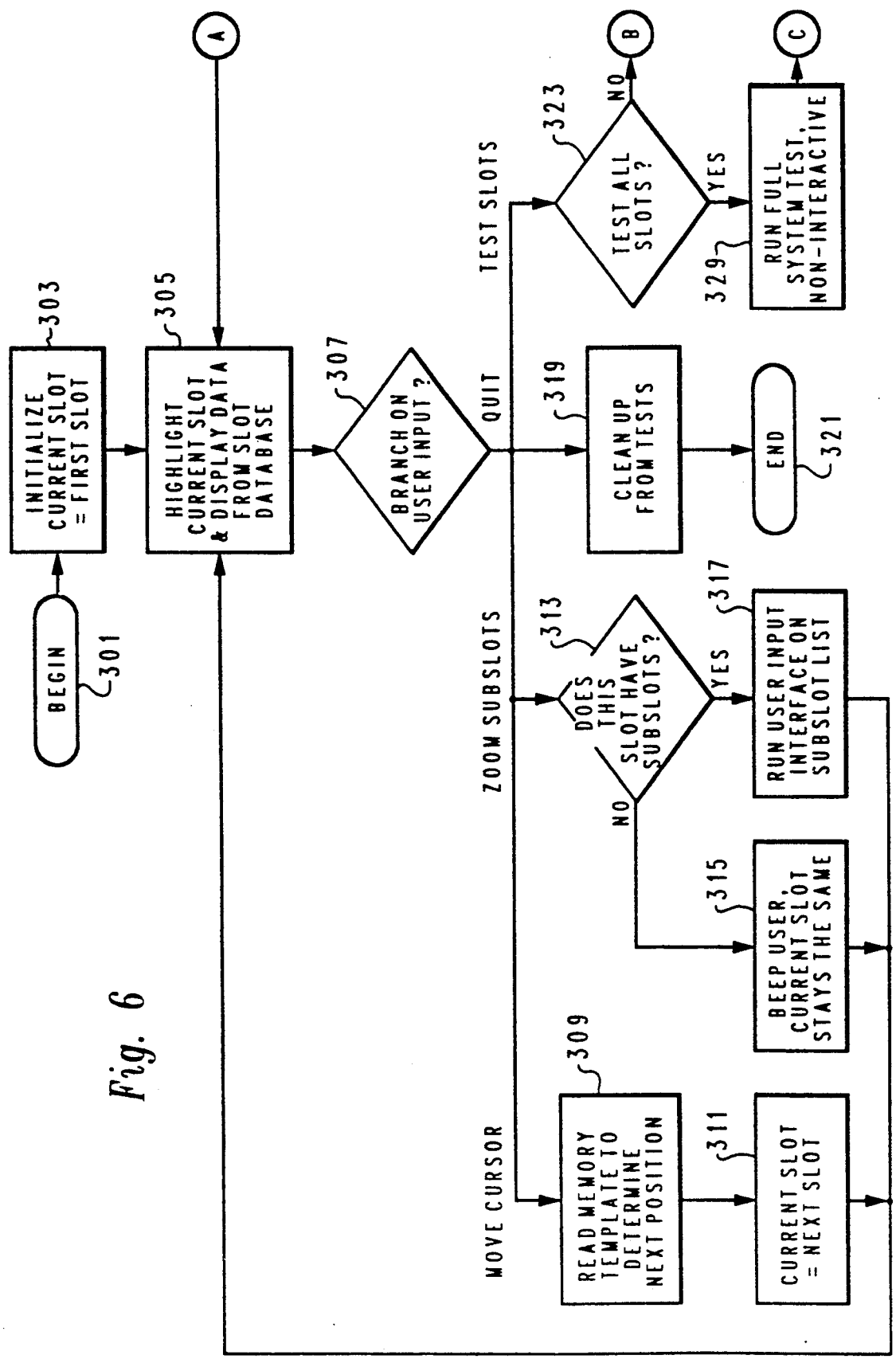
FIG. 6 and FIG. 6A depict a high level block diagram of the user test mode of the method and system of the graphic user interface for graphically depicting and testing the data processing system in accordance with a preferred embodiment of the present invention.
Figure 6A:
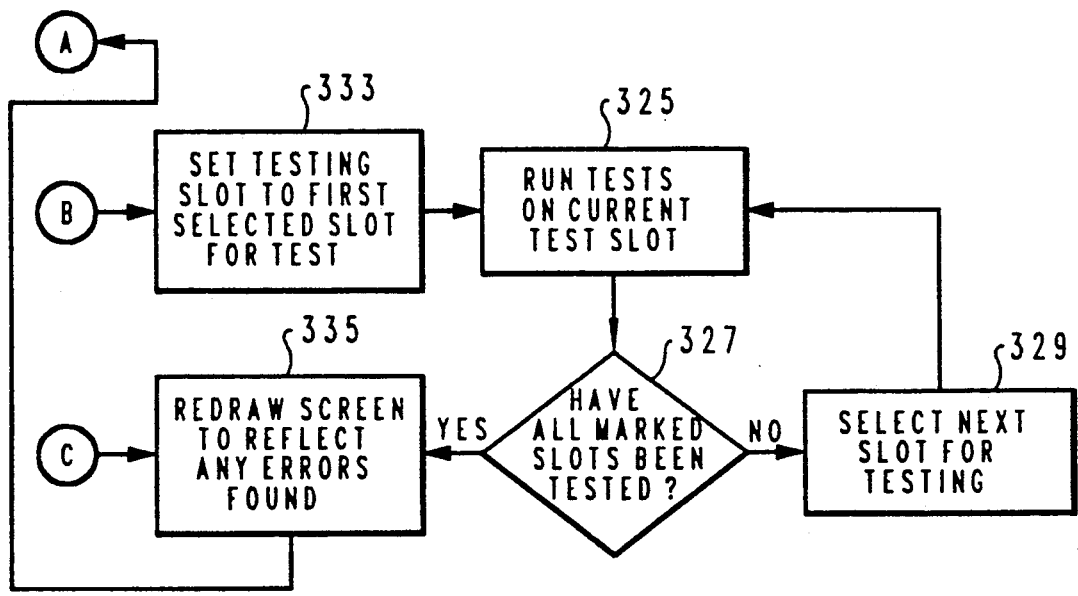

FIG. 6 and FIG. 6A depict a high level block diagram of the user test mode of the method and system of the graphic user interface for graphically depicting and testing the data processing system in accordance with a preferred embodiment of the present invention. The process begins in block 301 and thereafter passes to block 303, which illustrates an initialization by setting the current slot equal to the first slot. Block 305 depicts highlighting the current slot and displaying information from the slot database. The slot database contains information on possible components or subcomponents that may be located in a slot or subslot.

Afterwards, the process then proceeds to block 307, illustrating branching in response to input from a pointing device. The term pointing device, when utilized in this document, refers to any type of operating system supported pointing device including, but not limited to a mouse, keyboards, track ball, light pen, touch screen, and the like. If the input is to move the cursor, the process proceeds to block 309, which depicts the reading of the memory template to determine the next position. The memory template is memory set aside for storing information on the data processing system. The process then proceeds to block 311, which illustrates the setting of the current slot equal to the next slot. Thereafter the process returns to block 305 depicting the highlighted current slot and the displaying of information from the memory template.

Referring back to block 307, if zoom subslots is chosen the process proceeds to block 313, which depicts a determination of whether the slot contains subslots. If the slots do not have subslots, the process proceeds to block 315, illustrating alerting the user audially, i.e., a beep and not altering the depiction of the current slot. Thereafter, the process returns to block 305, depicting highlighting the current slot and displaying information from the memory template.

Referring back to block 313, if the slot contains subslots, the process then proceeds to block 317, which depicts running the interface on the subslot list. Running the interface on the subslot means bringing up the depiction of the subslot and allowing user input. This basically runs the user portion of the graphic user interface in accordance with a preferred embodiment of the present invention. Thereafter the process returns to block 305, depicting highlighting the current slot and displaying information from the slot database.

Referring back to block 307, if the input is to quit, the process then proceeds to block 319, illustrating cleaning up from tests and preparing to exit. Thereafter the process terminates in block 321.

Referring back to block 307 is the input is to test slots, the process then proceeds to block 323, which depicts a determination of whether all slots are to be tested. If all slots are not to be tested, the process then proceeds to block 333 in FIG. 6A, which illustrates the setting of testing slot to the first selected slot for test. Thereafter the process proceeds to block 325, depicting the running of tests on the current slot. This block is the diagnostic section of the graphic user interface for graphically depicting and testing a data processing system in accordance with a preferred embodiment of the present invention.

Next, the process proceeds to block 327, which illustrates a determination of whether all marked slots have been tested. If all the marked slots have not been tested, the process then proceeds to block 329, which depicts setting test slot to next selected slot for testing. Thereafter the process returns to block 325, which depicts the running of a test on current test slot. Referring back to block 327, if all the marked slots have been tested, the process then proceeds to block 335, illustrating the redrawing of the screen to reflect any errors found during testing. Thereafter the process returns to block 305, which depicts the highlighting of the current slot and the displaying of information from slot database.

Referring back to block 323 if all slots have been selected the process proceeds to block 329, which depicts running full system test in a non-interactive mode. This block illustrates the no user portion of the graphic user interface for graphically depicting and testing a data processing system in accordance with a preferred embodiment of the present invention. The process then proceeds to block 335, which illustrates redrawing the screen to reflect any errors found during testing. Thereafter the process returns to block 305, depicting the highlighting of the current slot and the displaying of information from the slot database. The process continues until quit is chosen through the user input in block 307, which as mentioned before, causes the process to proceed to block 319, which illustrated cleaning up from testing with the process terminating in block 321.

Figure 7:
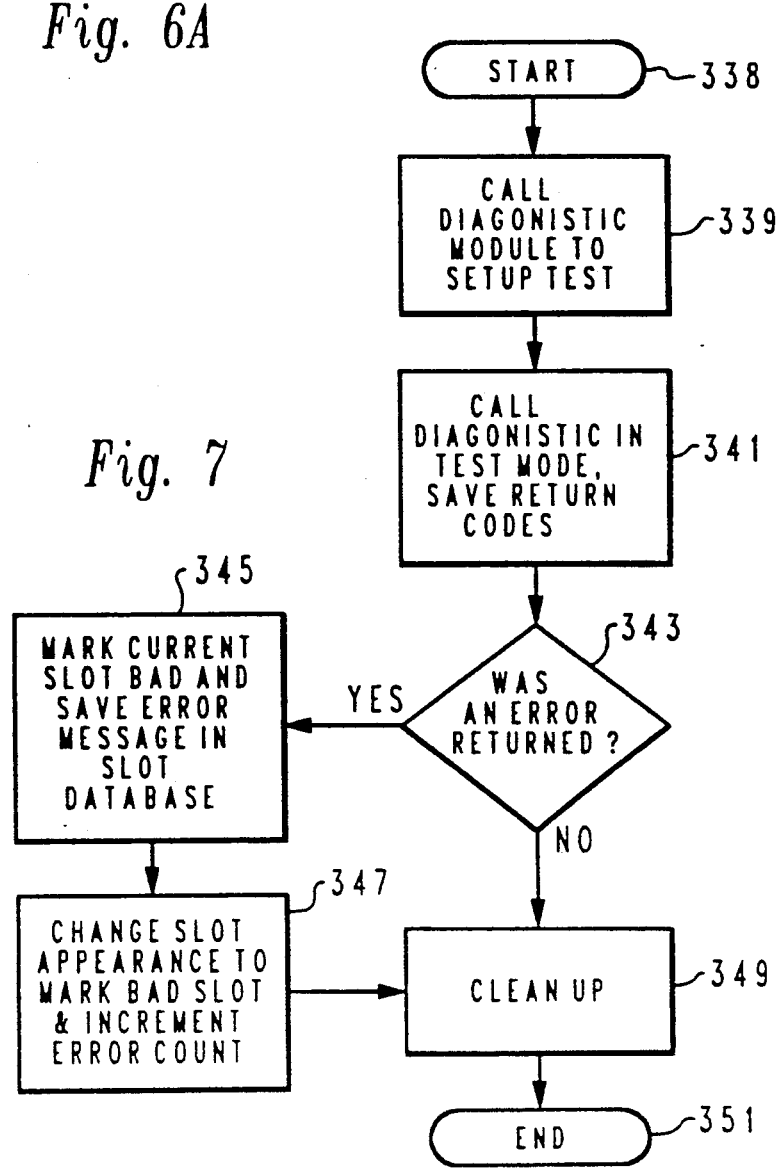
FIG. 7 depicts the diagnostic portion in the method and system of the graphic user interface for graphically depicting and testing a data processing system in accordance with a preferred embodiment of the invention.

FIG. 7 depicts the diagnostic portion in the method and system of the graphic user interface for graphically depicting and testing a data processing system in accordance with a preferred embodiment of the invention. The process begins in block 338 and thereafter proceeds to block 339, illustrating a call to the diagnostic module to set up testing and the wait for acknowledgement. The diagnostic module is usually in assembly level code. The process thereafter proceeds to block 341, which depicts the calling of the diagnostic in test mode and the saving return codes. Block 343 illustrates a determination of whether an error has been returned. If an error has been returned, the process proceeds to block 345, which depicts the marking of the current slot bad and the saving of the error message in the slot database.

Afterwards, the process proceeds to block 347, which illustrates the changing of the graphic appearance of the slot to mark the bad slot and the incrementing of the error count. Thereafter the process proceeds to block 349, depicting cleaning up from testing. Thereafter the process terminates in block 351.

Referring back to block 343, if no error is returned the process proceeds to block 349, which depicts cleaning up from testing. Afterwards, the process terminates in block 351.

Figure 8:
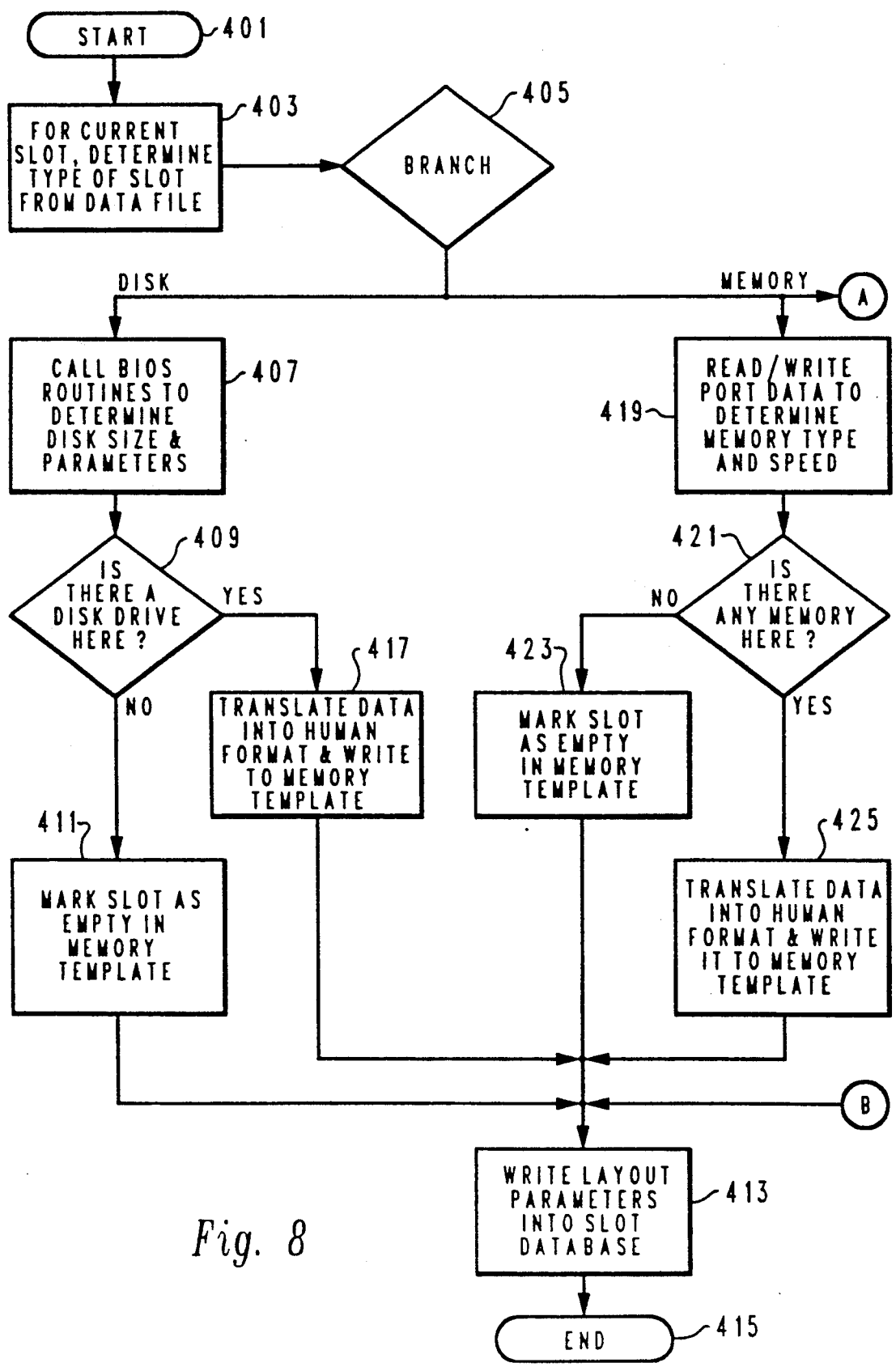
FIG. 8 and FIG. 8A depict a high level block diagram depicting the make slot portion of the method and system of the graphic user interface for graphically depicting and testing a data processing system in accordance with a preferred embodiment of the invention.
Figure 8A:
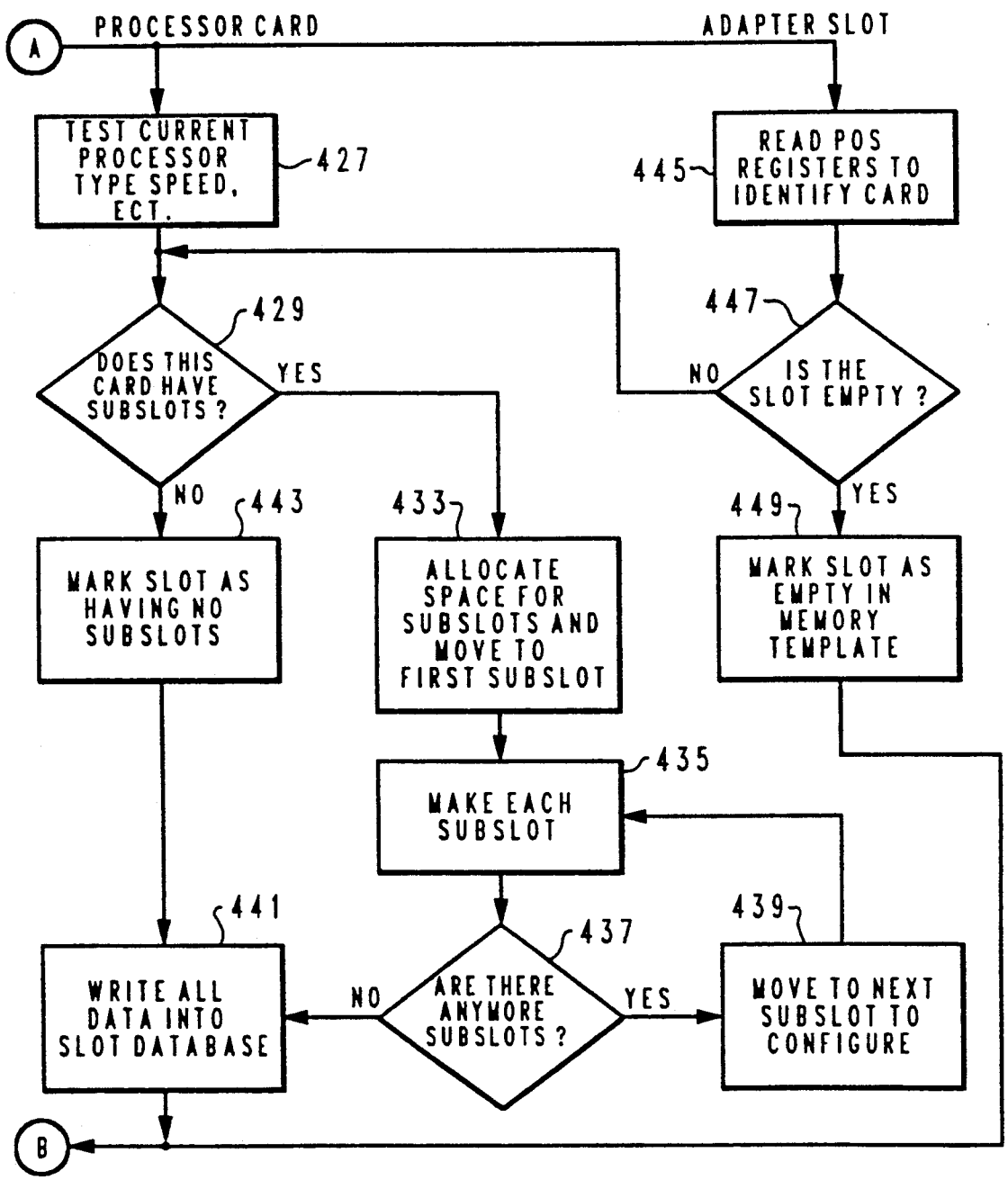

FIG. 8 is a high level block diagram depicting the make slot portion of the method and system of the graphic user interface for graphically depicting and testing a data processing system in accordance with a preferred embodiment of the invention. This portion of the present invention identifies components, subcomponents, and their locations. In addition, the absence of components or subcomponents in slots and subslots are also identified. The process begins in block 401 and thereafter proceeds to block 403 which illustrates retrieving type information on the current slot from the data file. Block 405 illustrates branching depending on the type of slot. If the slot is a disk slot, the process proceeds to block 407 which illustrates calling BIOS routines to determine the disk size and parameters. Block 409 depicts a determination of whether a component, a disk drive is present. If no disk drive component is present, the process then proceeds to block 411 which illustrates the marking of the slot as an empty slot in a memory template.

Thereafter the process proceeds to block 413 which depicts the writing of layout parameters into the database. The process terminates in block 415.

Referring back to block 409, if a disk drive is present, the process then proceeds to block 417 which illustrates translation of data into a human format and writing it to the memory template. The process then proceeds to block 413, which depicts the writing of the layout parameters into the database. The process then terminates in block 415.

Next, in block 405, if the current slot is a memory, the process then proceeds to block 419, which depicts reading/writing port data to determine the memory type and speed. Block 421 illustrates a determination of whether memory components are present. If no memory components are present, the process proceeds to block 423, which depicts the marking of the slot as an empty slot in the memory template and thereafter proceeding to block 413, depicting the writing of layout parameters into the memory template. Thereafter the process terminates in block 415.

Referring back to block 421, if memory is present the process the proceeds to block 425, which illustrates translation of data into human format and writing the information into the database. Basically, data in the data file is in a binary form and is converted to an easily usable form. Thereafter the process proceeds to block 413, depicting the writing of layout parameters into the memory template with the process terminating in block 415.

Referring back to block 405, if the current slot is a processor card, the process proceeds to block 427, which depicts the testing of current processor type, speed, etc. Block 429 illustrates a determination of whether the card contains subslots. If the card contains subslots, the process then proceeds to block 431, which illustrates the allocating of space for subslots moving to first subslot. Afterwards, the process proceeds to block 435, depicting making each subslot. Block 437 illustrates a determination of whether any more subslots need to be configured. If more subslots exist, the process proceeds to block 439 which depicts moving to next subslot to configure the subslot. The process then proceeds back to block 435, depicting making each subslot. Block 437 illustrates a determination of whether any more subslots need to be configured with this loop being continued until all subslots are configured.

When all subslots are configured, the process proceeds to block 441, which depicts the writing of all data into slot database. The process then proceeds to block 413, which depicts the writing of layout parameters into the memory template and the process terminates in block 415.

Referring back to block 429, if the card contains no subslots, the process then proceeds to block 443 illustrating the marking of the slot as having no subslots. Thereafter, the process proceeds to block 441, which depicts the writing of all data into the memory template. Afterwards, the process proceeds to block 413, depicting the writing of layout parameters into the database and terminating in block 415.

Referring back to block 405, if the current slot type is an adapter slot, the process proceeds to block 445, illustrating the reading of POS registers to identify the card. Block 447 depicts a determination whether the slot is empty. If the slot is empty, the process proceeds to block 449, which illustrates the marking of the slot as an empty slot having no card or component in the memory template and the process proceeds to block 413, depicting the writing of layout parameters into the memory template with the process terminating in block 415 thereafter.

Referring back to block 447, if the slot is not empty, the process proceeds to block 429, illustrating a determination of whether the card contains subslots. The same process followed for subslots as described for the processor card branch is followed for the adapter slot branch as described above.

Figure 9:
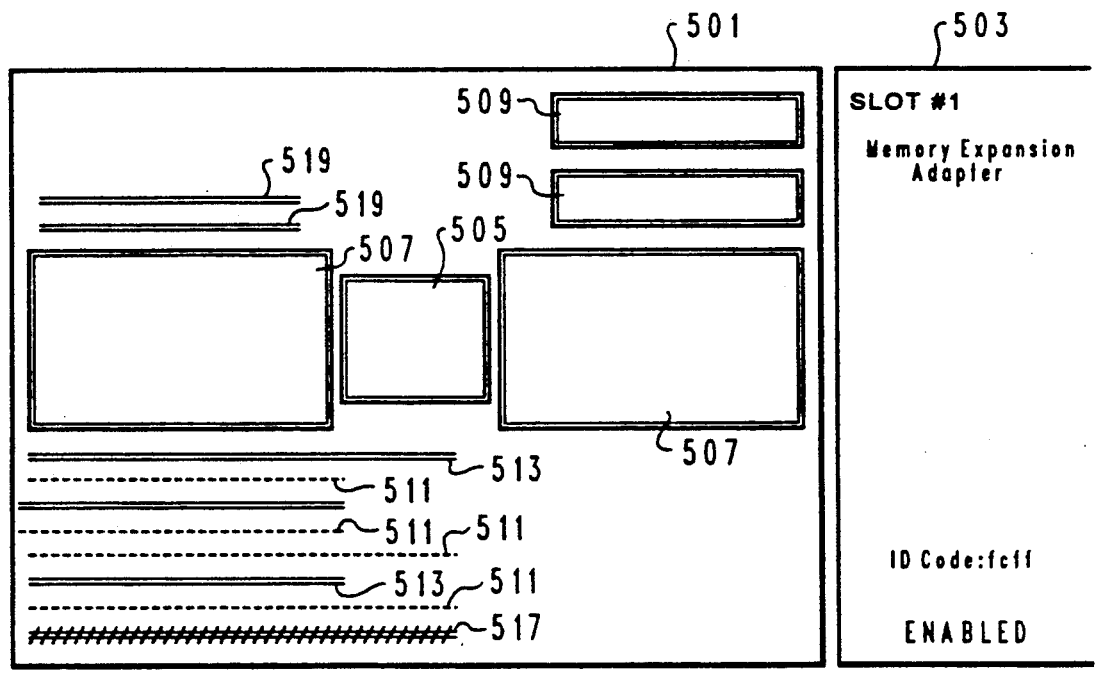
FIG. 9 depicts a graphic depiction of a data processing system in accordance with a preferred embodiment of the present invention.

FIG. 9 depicts a graphic depiction of a data processing system in accordance with a preferred embodiment of the present invention. System window 501 is a graphic depiction of the planar structure of a data processing system and information window 503 present textual information regarding selected components or subcomponents. System window 501 depicts a graphic depiction of a database system having a microprocessor 505, hard drives 507, and floppy drives 509. Also depicted are empty slots 511 and slots containing components 513. Slot 517 is a adapter slot that is currently selected. Slot 517 may be a memory adapter that is installed. Slots 519 is a depiction of planner memory SIMM connectors. The graphic depiction of the data processing system is a planar view depicting the location of components and subcomponents within the data processing system.

Figure 10:
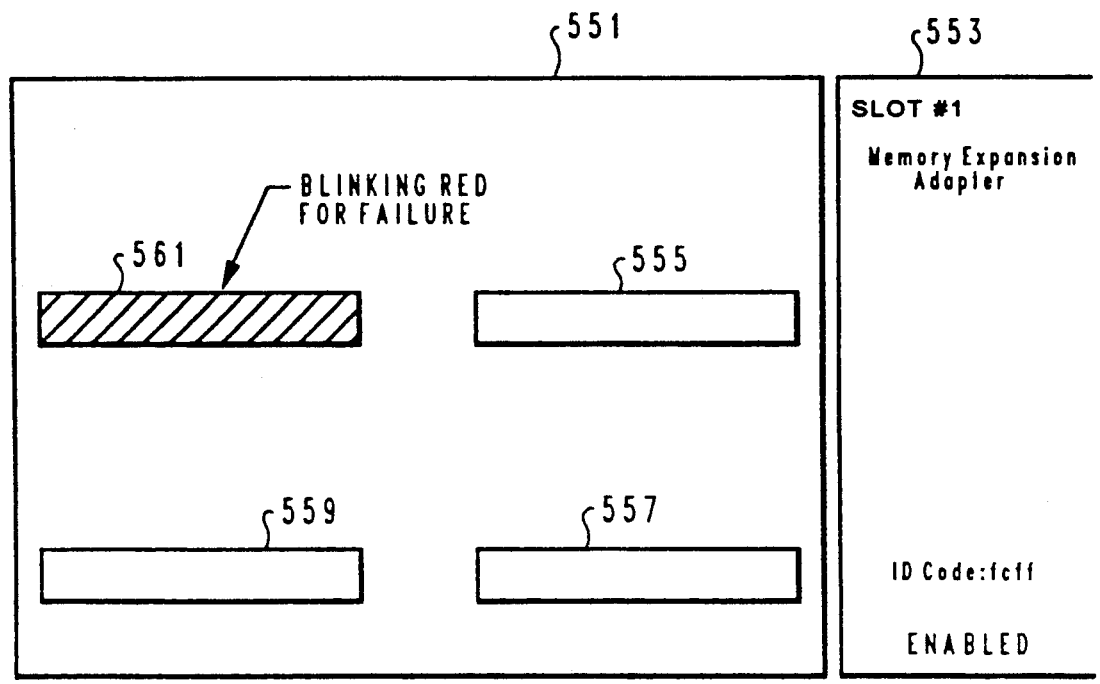
FIG. 10 is a graphic depiction depicting subcomponents in a component in the data processing system.

FIG. 10 is a graphic depiction depicting subcomponents, i.e., SIMM, in a component, i.e., memory adapter, on slots on the memory adapter, in the data processing system. The display of the graphic user interface contains two screens or windows in accordance with a preferred embodiment of the invention. System window 551 is a graphic depiction of a preferred embodiment of the present invention. Information window 553 presents textual information. In accordance with a preferred embodiment of the present invention, system window 551 graphically depicts four slots, slot 555, slot 557, slot 559 and slot 561.

In this example, slot 561 is graphically altered to indicate a failure. A failed or defective component can be graphically altered in various ways such as blinking red or some other color in a graphic display system that supports colors. In a monochrome graphic display system, a defective or failed component may be graphically indicated by graphically altering the slot to blink in a shade of gray. Furthermore, bad or good slots may be indicated by different colors or shades or by drawing lines or placing patterns within the slot. Information window 553 displays information as to the highlighted slot and displays error messages if the component is defective or has failed testing.

Many other types of information may be depicted graphically and textually under the present invention. For example, the present invention is also capable of determining the controlling microprocessor when multiple microprocessors are present. The present invention may interrogate multiple processor cards to determine the dominant microprocessor. This determination may also be graphically depicted.

Although the invention has been described with reference to a specific embodiment, this description is not meant to be construed in a limiting sense. Various modifications of the disclosed embodiment as well as alternative embodiments of the invention will become apparent to persons skilled in the art upon reference to the description of the invention. It is therefore contemplated that the appended claims will cover any such modifications or embodiments that fall within the true scope of the invention.

What is claimed is:

1. A graphical hardware description and testing interface for use with a data processing system comprising a plurality of components, said graphical hardware description and testing interface comprising:
    polling means for polling a data processing system to obtain data to determine a configuration of said data processing system, including identification of said plurality of components;
    data translation means, coupled to said polling means to receive data obtained by said polling means, for translating said data into a data format for display;
    graphic display means for displaying a graphic depiction of said data processing system, including said plurality of components, in response to receiving data in a data format for display from said data translation means, wherein said graphic depiction illustrates a layout of said data processing system;
    testing means for selectively testing a particular one of said plurality of components to determine if said particular one of said plurality of components is defective and generating an indication of a status of said particular one of said plurality of components in response to a result from testing said particular one of said plurality of components; and
    display control means coupled to said graphic display means for selectively altering said graphic depiction of said data processing system, including said plurality of components, in response to receiving said indication from said testing means.

2. The graphical hardware description and testing interface of claim 1 wherein said testing means includes means for determining a dominant microprocessor if a plurality of microprocessors are present in said data processing system.

3. The graphical hardware description and testing interface of claim 2, wherein said display control means coupled to said graphic display means for selectively altering said graphic depiction of said data processing system further includes graphically altering said graphic depiction of said data processing system, including said plurality of components to indicate said dominant microprocessor.

4. The graphical hardware description and testing interface of claim 1 further comprising a selection means for selecting said particular one of said plurality of components for testing.

5. The graphical hardware and testing interface of claim 4 further comprising a user input means coupled to said selection means for permitting a user to select said particular one of said plurality of components for testing.

6. The graphical hardware and testing interface of claim 5, wherein said user input means comprising a graphical pointing device.

7. The graphical hardware description and testing interface of claim 1, wherein said plurality of components includes a plurality of subcomponents;
    wherein said graphic display means for displaying a graphic depiction of said data processing system, including said plurality of components, further comprises means for displaying a graphic depiction of said plurality of subcomponents;
    wherein said testing means for selectively testing at least one of said plurality of components further comprises means for selectively testing a particular one of said plurality of subcomponents and generating an indication of a status of said particular one of said plurality of components in response to a result from testing said particular one of said plurality of components;
    wherein said display control means coupled to said testing means and to said graphic display means for selectively altering said graphic depiction of said data processing system, including said plurality of components, further comprises means for selectively altering said graphic depiction of said plurality of subcomponents in response to receiving said indication from said testing means.

8. The graphical hardware description and testing interface of claim 1, wherein said display control means further includes means for selectively altering said graphic depiction of said data processing system to indicate a defect in said particular one of said plurality of components, in response to a determination that said particular one of said plurality of components is defective.

9. The graphical hardware description and testing interface of claim 8, wherein a defect in said particular one of said plurality of components is indicated by altering a graphic depiction of said particular one of said plurality of components within said graphic depiction of said data processing system to a red color.

10. A method in a data processing system for providing a graphic user interface for graphically depicting and testing said data processing system comprising:
    polling said data processing system to obtain data to determine a configuration of said data processing system, including identifying a plurality of components;
    translating data obtained from polling said data processing system to obtain data to determine a configuration of said data processing system, including identifying a plurality of components into a data format for display;

displaying a graphic depiction of said data processing system, including said plurality of components, responsive to translating data obtained from polling said data processing system to obtain data to determine a configuration of said data processing system, including identifying a plurality of components into a data format for display;

selectively testing a particular one of said plurality of components to determine whether said particular one of said plurality of components is defective; and selectively altering said graphic depiction of said data processing system, including said plurality of components, in response to said selectively testing of said particular one of said plurality of components.

11. The method of claim 10 further including the step of altering said graphic depiction of said data processing system, including said plurality of components, to graphically indicate said particular one of said plurality of components being selectively tested.

12. The method of claim 10 further including the steps of altering said graphic depiction of said data processing system, including said plurality of components, to indicate a defective component in response to a determination that said particular one of said plurality of components is defective.

13. A graphical hardware description and testing interface for use with a data processing system comprising a plurality of components, said graphical hardware description and testing interface comprising:

polling means for polling a data processing system to determine a configuration of said data processing system, including identification of said plurality of components;

data translation means, coupled to said polling means for receiving data from said polling means and for translating said data obtained by said polling means into a data format suitable for display;

graphic display means for displaying a graphic depiction of said data processing system, including said plurality of components, using data in a data format suitable for display in response to said translation of said data obtained by said polling means, wherein said graphic depiction illustrates a physical layout of said data processing system, including a physical location of said plurality of components;

testing means for selectively testing a particular one of said plurality of components to determine if said particular one of said plurality of components has failed; and display control means coupled to said graphic display means and to said testing means for selectively altering said graphic depiction of said data processing system to indicate a failure of said particular one of said plurality of components, in response to a determination by said testing means that said particular one of said plurality of components has failed.

14. The graphical hardware description and testing interface of claim 13, wherein said testing means further comprises means for altering said data in a format suitable for display corresponding to a particular one of said plurality of components that has failed to indicate a failure of said particular one of said plurality of components and wherein said display control means further comprises means for selectively altering said graphic depiction of said data processing system to indicate a failure of said particular one of said plurality of components, in response to an alteration of said data by said testing means.

15. The graphical hardware description and testing interface of claim 14, wherein said plurality of components includes a plurality of subcomponents;

wherein said graphic display means coupled to said data translation means for displaying a graphic depiction of said data processing system, including said plurality of components, further comprises displaying a graphic depiction of said plurality of subcomponents;

wherein said testing means for selectively testing at least one of said plurality of components further comprises means for selectively testing a particular one of said plurality of subcomponents; and wherein said display control means coupled to said testing means and to said graphic display means for selectively altering said graphic depiction of said data processing system, including said plurality of components, further comprises means for selectively altering said graphic depiction of said plurality of subcomponents in response to said selectively testing of said particular one of said plurality of subcomponents.

16. A method in a data processing system for providing a graphic user interface for graphically depicting and testing said data processing system comprising:

polling said data processing system to obtain data to determine a configuration of a data processing system, including identifying a plurality of components;

translating data obtained from polling said data processing system into a data format for display;

displaying a graphic depiction of said data processing system, including said plurality of components, responsive to translating data obtained from polling said data processing system into a data format for display;

selectively testing a particular one of said plurality of components to determine whether said particular one of said plurality of components has failed; and selectively altering said graphic depiction of said data processing system to indicate a failure of said particular one of said plurality of components, in response to a determination that said particular one of said plurality of components has failed.

17. The method of claim 16 further including the step of altering said graphic depiction of said data processing system, including said plurality of components, to graphically indicate said particular one of said plurality of components being selectively tested.

* * * * *